(12) United States Patent
Riedmann et al.

(10) Patent No.: US 9,252,619 B2
(45) Date of Patent: Feb. 2, 2016

(54) METHOD FOR THE RESISTIVE CELL EQUALIZATION OF BATTERY CELLS OF A BATTERY, A BATTERY WHICH IS CONTROLLED IN ACCORDANCE WITH THE METHOD, AND A MOTOR VEHICLE

(71) Applicants: Robert Bosch GmbH, Stuttgart (DE); Samsung SDI Co., Ltd., Yongin-si, Gyeonggi-do (KR)

(72) Inventors: Matthias Riedmann, Stuttgart (DE); Stephan Rees, Ludwigsburg (DE); Ulrich Zimmermann, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 13/855,797

(22) Filed: Apr. 3, 2013

(65) Prior Publication Data
US 2013/0257322 A1    Oct. 3, 2013

(30) Foreign Application Priority Data
Apr. 3, 2012  (DE) .......................... 10 2012 205 396

(51) Int. Cl.
*H02J 7/00*       (2006.01)
*B60L 11/18*     (2006.01)

(52) U.S. Cl.
CPC ........... *H02J 7/0068* (2013.01); *B60L 11/1805* (2013.01); *B60L 11/1866* (2013.01); *Y02T 10/7005* (2013.01); *Y02T 10/7011* (2013.01); *Y02T 10/7061* (2013.01)

(58) Field of Classification Search
CPC ............................... B60L 11/1866; H02J 3/28
USPC ................ 320/107–108, 132–136, 116–120, 320/124–128; 324/434; 702/63
See application file for complete search history.

(56) References Cited

U.S. PATENT DOCUMENTS

| | | | |
|---|---|---|---|
| 5,429,888 A | 7/1995 | Hall | |
| 7,245,108 B2 * | 7/2007 | Chertok et al. | 320/132 |
| 2003/0146737 A1 * | 8/2003 | Kadouchi et al. | 320/132 |
| 2011/0109269 A1 | 5/2011 | Li | |

FOREIGN PATENT DOCUMENTS

| | | |
|---|---|---|
| CN | 201113508 Y | 9/2008 |
| CN | 101752890 A | 6/2010 |
| JP | 2005-5162 A | 1/2005 |

* cited by examiner

*Primary Examiner* — Paul Dinh
(74) *Attorney, Agent, or Firm* — Maginot, Moore & Beck LLP

(57) ABSTRACT

A method for the resistive charge equalization of battery cells of a battery, includes, in a first step, ascertaining the state of charge of the battery cells ascertained and correlating the battery cells of which the state of charge exceeds a predefined value with a first mask, which permits charge equalization only for a predefined portion of all the battery cells, wherein, then, charge equalization is performed. In a second step, the state of charge of the battery cells is optionally ascertained again and the battery cells of which the state of charge exceeds a predefined value are correlated with a second mask, which differs from the first mask, and wherein, then, charge equalization is performed. As a result, the heat generated during charge equalization is distributed in space and time such that no local overheating of or damage to components occurs and no overtemperature disconnection of the battery occurs.

12 Claims, 1 Drawing Sheet

FIG. 1

| 36 | 34 | 32 | 30 | 28 | 26 | 24 | 22 | 20 | 18 | 16 | 14 | 12 | 10 | 8 | 6 | 4 | 2 |
|----|----|----|----|----|----|----|----|----|----|----|----|----|----|---|---|---|---|
| 35 | 33 | 31 | 29 | 27 | 25 | 23 | 21 | 19 | 17 | 15 | 13 | 11 | 9  | 7 | 5 | 3 | 1 |

FIG. 2

| 1 | 2 | 1 | 2 | 1 | 2 | 1 | 2 | 1 | 2 | 1 | 2 | 1 | 2 | 1 | 2 | 1 | 2 |
|---|---|---|---|---|---|---|---|---|---|---|---|---|---|---|---|---|---|
| 2 | 1 | 2 | 1 | 2 | 1 | 2 | 1 | 2 | 1 | 2 | 1 | 2 | 1 | 2 | 1 | 2 | 1 |

METHOD FOR THE RESISTIVE CELL EQUALIZATION OF BATTERY CELLS OF A BATTERY, A BATTERY WHICH IS CONTROLLED IN ACCORDANCE WITH THE METHOD, AND A MOTOR VEHICLE

This application claims priority under 35 U.S.C. §119 to patent application no. DE 10 2012 205 396.4, filed on Apr. 3, 2012 in Germany, the disclosure of which is incorporated herein by reference in its entirety.

BACKGROUND

The present disclosure relates to a method for the resistive cell equalization of battery cells of a battery, to a battery having at least two battery cells and an apparatus for battery control, and to a motor vehicle.

A large number of battery cells is usually connected in series in batteries in order to achieve a sufficiently high output voltage for the respective application. The series connection of battery cells means it is necessary for an output current of the battery to flow in all battery cells.

On account of the leakage currents of different magnitudes or a different total capacity of the individual battery cells, the states of charge of said battery cells differ from one another.

In order to achieve optimum and reliable utilization of the battery capacity, it is therefore necessary to ensure that the current state of charge of the battery cells in relation to one another is as identical as possible. In order to achieve this, what is known as balancing (cell equalization or charge equalization) is periodically carried out. In this case, the states of charge of the battery cells are influenced by charging or discharging such that a uniform state of charge is achieved.

A conventional method for balancing is resistive balancing, in which a portion of the charge of the cells which are excessively charged is converted into thermal energy in an electrical resistor, that is to say the state of charge of the battery cells is changed to a uniform level by deliberate reduction in individual battery cells. In this case, each battery cell has its own balancing resistor between the poles, it being possible for said balancing resistor to be activated by means of an electrical switch. These balancing resistors are usually located in a controller and are activated as required. In this case, a large number of resistors are generally activated at the same time.

The high thermal power which is produced locally on an activated balancing resistor may result in considerable heating of the resistors and their surrounding area, in particular of the printed circuit board as well. The associated absolute increase in temperature and the aging of the resistors which is caused by a change in temperature can lead to destruction of balancing resistors, adjacent components or solder connections and the like.

US 2011/0109269 A1 discloses a circuit and a method for resistive balancing in battery cells.

SUMMARY

The disclosure discloses a method for the resistive charge equalization of battery cells of a battery, in which method, in a first step, the state of charge of the battery cells is ascertained and the battery cells of which the state of charge exceeds a predefined value are correlated with a first mask which permits charge equalization only for a predefined portion of all the battery cells. Then, resistive charge equalization is performed for the battery cells of which the state of charge requires charge equalization and which are contained on the mask.

In a second step, the state of charge of the battery cells is optionally ascertained again and the battery cells of which the state of charge exceeds a predefined value are correlated with a second mask which differs from the first mask. If the state of charge is not checked in a second step, the battery cells which exceeded the predefined value for the state of charge in the first step are equalized directly with the second mask. Then, resistive charge equalization is performed for the battery cells of which the state of charge requires charge equalization and which are contained on the second mask.

This process is repeated as required. To this end, the state of charge of the battery cells is checked at regular intervals.

The second step can be implemented immediately following the first step, but the second step preferably takes place only after a predefined period of time, so that the heat which is emitted in the first step can be reliably transported away. The duration of this period of time is given by the conditions in the battery system and can be predetermined by a person skilled in the art. The duration can also be made dependent on the aging state of the battery, a time factor or the like.

In the case of resistive charge equalization or balancing, charge of the excessively charged cells is, as already described, converted into thermal energy in an electrical resistor. Since the heat which is generated during balancing is correlated with the balancing requirement which is determined by the properties of the battery cells, the total amount of heat which is generated overall cannot be reduced.

The masks and the selection of the battery cells which are located on said masks depend on the local position of the balancing resistors in the layout of a controller and are designed such that no resistors which are situated close together are located in the same mask. In this case, the sum of all the masks has to contain all the battery cells and resistors so that complete charge equalization can take place. However, it is possible, in principle, for the same resistors to be contained in a plurality of masks in order to be able to subject battery cells which are particularly heavily loaded, for example on account of their spatial arrangement, to charge equalization at shorter intervals.

The suitable number of masks depends on the local position of the balancing resistors on the layout. Therefore, it is also possible for three and more masks to be used, wherein these differ in each case in respect of the selection of the battery cells which are intended to be subjected to charge equalization.

According to a preferred variant of the method, two masks are used since this is generally sufficient to avoid damage.

By virtue of the use, according to the disclosure, of at least two different masks, it is advantageously possible to distribute the generated heat in respect of space and time such that no local overheating of and therefore damage to components can occur or that overtemperature disconnection of the battery can occur. In this case, the local distribution of heat depends on the arrangement of the resistors which are activated at the same time during balancing or charge equalization.

The value for the state of charge, usually a value for the cell voltage at which, when it is exceeded, charge equalization is suggested, is prespecified by controlling the battery and can be made dependent on the aging state, a time factor or the like.

The masks can be encoded as a simple bit sequence matching the respective layout and applied to the balancing requirements in the application software of the battery control system.

The disclosure also relates to a battery, preferably a rechargeable lithium-ion battery having at least two battery cells and an apparatus for battery control, which apparatus is designed to execute the method according to the disclosure, and to a motor vehicle having an electric drive motor for driving the motor vehicle and a battery which is or can be connected to the electric drive motor.

BRIEF DESCRIPTION OF THE DRAWINGS

Exemplary embodiments of the disclosure will be explained in greater detail with reference to the following description and the drawings, in which:

FIG. 1 shows a schematic view of battery cells of a battery, and

FIG. 2 shows a schematic view of the association of two masks with the battery cells.

DETAILED DESCRIPTION

Figures 1, 2:
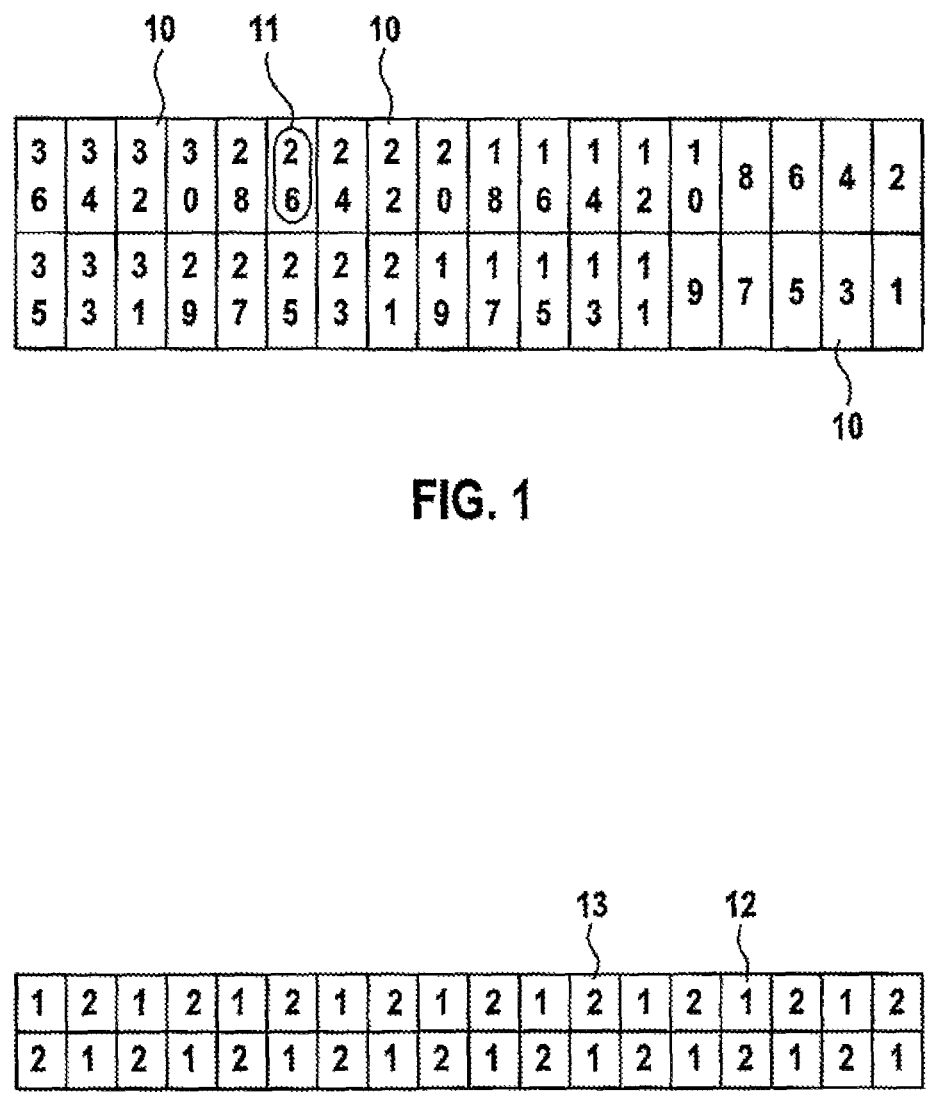

FIG. 1 schematically shows the spatial arrangement of battery cells 10 and therefore a corresponding spatial arrangement of resistors for resistive charge equalization. The battery cells 10 have a cell number 11 for clear identification.

Association of the battery cells 10 with two masks 12, 13, which define charge equalization in respect of space and time, is illustrated in FIG. 2. The schematic arrangement of the masks 12, 13 corresponds to the arrangement of the battery cells 10. The battery cells 10 are distributed between the two masks 12, 13 in such a way that each cell is represented only on one mask 12 or 13 and that each battery cell 10 of a mask 12, 13 is contacted by battery cells of the same mask 12, 13 only at the corners and not at the side faces.

If a need for charge equalization is established when the states of charge of the battery cells 10 are checked, all the battery cells 10 which are associated with the first mask 12 and require charge equalization are initially subjected to said charge equalization.

At a later point in time, the state of charge of the battery cells 10 is ascertained again. Since the battery cells 10 which are contained on the first mask 12 have already been equalized, the new balancing requirement is composed predominantly of battery cells 10 which are contained in the second mask 13.

The battery cells 10 which require charge equalization are then equalized with the second mask 13, wherein the battery cells 10 which are located on said second mask are subjected to charge equalization. The abovementioned steps are repeated if desired.

What is claimed is:

1. A method for resistive charge equalization of battery cells of a battery, comprising:
    measuring a state of charge of the battery cells;
    identifying the battery cells in which the state of charge exceeds a first predefined state of charge value and which are associated with a first mask, the first mask representing a spatial arrangement of a first predefined portion of all the battery cells that undergo charge equalization together;
    performing a first resistive charge equalization for the battery cells in which the state of charge exceeds the first predefined state of charge value and which are associated with the first mask by discharging through corresponding balancing resistors;
    identifying the battery cells in which the state of charge exceeds a second predefined state of charge value and which are associated with a second mask, the second mask representing a spatial arrangement of a second predefined portion of all the battery cells that undergo charge equalization together, the second mask differing from the first mask; and
    performing a second resistive charge equalization for the battery cells in which the state of charge exceeds the second predefined state of charge value and which are associated with the second mask by discharging through corresponding balancing resistors.

2. The method according to claim 1, further comprising:
    using additional masks; and
    for each respective additional mask, (i) identifying the battery cells in which the state of charge exceeds a respective predefined state of charge value with the respective additional mask the respective additional mask representing a spatial arrangement of a respective predefined portion of all the battery cells that undergo charge equalization together; and (ii) performing a respective resistive charge equalization for the battery cells in which the state of charge exceeds the respective predefined state of charge value and which are associated with the respective additional mask by discharging through corresponding balancing resistors.

3. The method according to claim 1, wherein, after performing the second resistive charge equalization, the method is repeated at least once.

4. The method according to claim 1, wherein a predefined time period passes between performing the first resistive charge equalization and identifying the battery cells in which the state of charge exceeds the second predefined state of charge value and which are associated with the second mask.

5. The method according to claim 1, wherein the battery cells associated with the first mask and the second mask collectively comprise all the battery cells.

6. The method according to claim 1, wherein some of the battery cells are associated with at least two masks.

7. The method according to claim 1, further comprising:
    measuring the state of charge of the battery cells again after performing the first resistive charge equalization.

8. A battery comprising:
    at least two battery cells; and
    an apparatus for battery control configured to (i) measure a state of charge of the at least two battery cells, (ii) identify battery cells in which the state of charge exceeds a predefined state of charge value and which are associated with a first mask, the first mask representing a spatial arrangement of a first predefined portion of all the battery cells that undergo charge equalization together, (iii) perform a first resistive charge equalization for the battery cells in which the state of charge exceeds the first predefined state of charge value and which are associated with the first mask by discharging through corresponding balancing resistors, (iv) identify the battery cells in which the state of charge exceeds a second predefined state of charge value and which are associated with a second mask, the second mask representing a spatial arrangement of a second predefined portion of all the battery cells that undergo charge equalization together, the second mask differing from the first mask, and (v) perform a second resistive charge equalization for the battery cells in which the state of charge exceeds the second predefined state of charge value and which are associated with the second mask by discharging through corresponding balancing resistors.

9. The battery according to claim 8, wherein the battery is a rechargeable lithium-ion battery.

10. The battery according to claim 8, wherein the apparatus for battery control is further configured to measure the state of charge of the battery cells again after performing the first resistive charge equalization.

11. A motor vehicle comprising:
- an electric drive motor configured to drive the motor vehicle; and
- a battery connected to the electric drive motor and including at least two battery cells and an apparatus for battery control,
- wherein the apparatus for battery control is configured to (i) measure a state of charge of the at least two battery cells, (ii) identify battery cells in which the state of charge exceeds a predefined state of charge value and which are associated with a first mask, the first mask representing a spatial arrangement of a first predefined portion of all the battery cells that undergo charge equalization together, (iii) perform a first resistive charge equalization for the battery cells in which the state of charge exceeds the first predefined state of charge value and which are associated with the first mask by discharging through corresponding balancing resistors, (iv) identify the battery cells in which the state of charge exceeds a second predefined state of charge value and which are associated with a second mask, the second mask representing a spatial arrangement of a second predefined portion of all the battery cells that undergo charge equalization together, the second mask differing from the first mask, and (v) perform a second resistive charge equalization for the battery cells in which the state of charge exceeds the second predefined state of charge value and which are associated with the second mask by discharging through corresponding balancing resistors.

12. The motor vehicle according to claim 11, wherein the apparatus for battery control is further configured to measure the state of charge of the battery cells again after performing the first resistive charge equalization.

* * * * *